US007777385B2

(12) United States Patent
Wingett et al.

(10) Patent No.: US 7,777,385 B2
(45) Date of Patent: Aug. 17, 2010

(54) COMPACT, ELECTROMAGNETICALLY BRAKED ACTUATOR ASSEMBLY

(75) Inventors: Paul Wingett, Mesa, AZ (US); Glenn Lane, Chandler, AZ (US); Cal Potter, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 174 days.

(21) Appl. No.: 12/120,938

(22) Filed: May 15, 2008

(65) Prior Publication Data

US 2009/0284089 A1 Nov. 19, 2009

(51) Int. Cl.
*H02K 37/00* (2006.01)

(52) U.S. Cl. ........................................ 310/181; 310/99

(58) Field of Classification Search ................ 310/181, 310/99, 75 R, 80, 83

See application file for complete search history.

(56) References Cited

U.S. PATENT DOCUMENTS 2,837,670 A 6/1958 Thomas et al.
3,344,378 A 9/1967 Wilhelmson
3,423,617 A 1/1969 Kohlhagen
3,466,518 A 9/1969 Aylikci et al.
3,855,560 A 12/1974 Ward
3,934,216 A 1/1976 Ward
3,984,711 A * 10/1976 Kordik .................... 310/49.46
4,315,171 A 2/1982 Schaeffer
4,441,675 A 4/1984 Boehringer et al.
4,500,861 A 2/1985 Nelson
4,563,606 A 1/1986 Fukasawa et al.
4,647,889 A 3/1987 Addis
4,673,852 A 6/1987 Geiger
4,766,362 A 8/1988 Sadvary
4,843,270 A 6/1989 Dijken
5,043,618 A 8/1991 Stephenson
5,087,845 A 2/1992 Behrens et al.
5,175,462 A 12/1992 Yoshino et al.
5,233,252 A 8/1993 Denk
5,281,094 A 1/1994 McCarty et al.
5,327,069 A 7/1994 Radun et al.
5,444,318 A 8/1995 Stumpf
5,548,173 A 8/1996 Stephenson
5,625,276 A 4/1997 Scott et al.
5,631,511 A * 5/1997 Schulmann et al. ........... 310/83
5,677,581 A 10/1997 Yoshida et al.
5,712,520 A 1/1998 Lamb
5,914,576 A 6/1999 Barba
5,920,139 A 7/1999 Fujiwara et al.
5,936,386 A 8/1999 Heglund
5,986,370 A 11/1999 Cheng
6,012,347 A 1/2000 Hasegawa
6,018,200 A 1/2000 Anderson et al.

(Continued)

OTHER PUBLICATIONS

Potter, C.; Power Drive Unit Electromagnetic Latch, May 12, 2006, U.S. Appl. No. 11/433,118.

*Primary Examiner*—Dang D Le
(74) *Attorney, Agent, or Firm*—Ingrassia Fisher & Lorenz, P.C.

(57) ABSTRACT

An actuator assembly includes a motor assembly, a harmonic drive gearbox, an actuator, and an electromagnet brake device. The actuator assembly is fairly compact in size and the electromagnetic brake device is a non-contact type of devices, making it less prone to wear as compared to many other brake devices.

11 Claims, 4 Drawing Sheets

110 404 124 126 406 402 122 408

U.S. PATENT DOCUMENTS 6,020,804 A 2/2000 Gandel
6,079,303 A 6/2000 Lyachovitsky
6,097,123 A 8/2000 Weiss et al.
6,100,619 A * 8/2000 Buscher et al. ............... 310/99
6,177,746 B1 1/2001 Tupper et al.
6,252,325 B1 6/2001 Nashiki
6,262,508 B1 7/2001 Shibayama et al.
6,325,331 B1 12/2001 McKeown
6,380,733 B1 4/2002 Apel et al.
6,507,257 B2 1/2003 Mohler
6,518,685 B2 2/2003 Nelson
6,661,206 B2 12/2003 Gallegos-Lopez
6,700,271 B2 3/2004 Detela
6,777,842 B2 8/2004 Horst
6,812,816 B1 11/2004 Easton
6,879,072 B2 4/2005 Frey et al.
6,946,938 B1 9/2005 Pedersen
6,956,453 B2 10/2005 Osterberg
7,030,724 B2 4/2006 Pedersen et al.
7,135,947 B2 11/2006 Engel
7,306,535 B2 12/2007 Menjak et al.
2004/0021390 A1 2/2004 Kim et al.
2005/0247529 A1 11/2005 Gaines et al.

* cited by examiner

COMPACT, ELECTROMAGNETICALLY BRAKED ACTUATOR ASSEMBLY

TECHNICAL FIELD

The present invention generally relates to actuator assemblies, and more particularly to a relatively small, compact, and electromagnetically braked actuator assembly.

BACKGROUND

Actuator assemblies are used in myriad devices and systems. For example, many vehicles including, for example, aircraft, spacecraft, watercraft, and numerous other terrestrial and non-terrestrial vehicles, include one or more actuator assemblies to effect the movement of various control surfaces or components. In many applications, the actuator assemblies include power drive units, such as motors, that are configured to receive a source of drive power to move an actuator, and thus the control surfaces or components, to a commanded position. When the control surfaces or components reach the commanded position, the source of drive power may be removed. Thus, many of the actuator assemblies that are used include what is sometimes referred to as a no-back device. The no-back device is configured to hold the actuator in position against the load once the actuator has moved the control surface or component to the commanded position.

The types and configurations of no-back devices that are included in actuator assemblies vary. One particular type of no-back device that is used is a permanent magnet device. This type of device typically includes one or more permanent magnets that prevent rotation of the power drive unit when the source of drive power is removed. Another type of no-back device is a multi-rotor friction brake. Although these types of no-back devices, as well as the various other device types that are currently known, are generally safe, reliable, and robust, these devices do suffer certain drawbacks. For example, the presently known devices permanent magnet devices supply a continuous magnetic force against power drive unit rotation, in at least one rotational direction, that the power drive unit may need to overcome each time it is supplied with drive power. As a result, the size of the power drive unit may be larger than what is needed to move the load alone, in order to overcome this magnetic force, which can increase overall actuator and system size, weight, and costs. Moreover, the friction type devices can wear relatively quickly, resulting in the need to replace the devices, which can increase overall costs.

In addition to the above, many actuators include an interposing element, such as a gear assembly or screw, between the power drive unit and the actuator. In many instances, it is desirable to physically implement an actuator that has a relatively small size and low weight. In the past, these goals have been met by using a relatively small electric motor that rotates at a relatively high rotational speed, and then including some type of gear reduction to increase the output torque of the actuator.

Hence, there is a need for a no-back device that does not supply force against drive unit rotation, and/or is less prone to wear, and/or does not result in increased overall actuator assembly and system size, weight, and/or costs. There is also a need for an actuator assembly that includes a small, high speed motor with sufficient gear reduction that has a relatively small space envelope and/or relatively smaller weight as compared to known actuator assembly configurations. The present invention addresses at least one or more of these needs.

BRIEF SUMMARY

In one embodiment, and by way of example only, an actuator assembly includes a motor assembly, a harmonic drive gearbox, an actuator, a latch rotor, one or more permanent magnets, and a latch electromagnet. The motor assembly includes a motor and a motor shaft, and the motor is configured to supply a first torque to the motor shaft. The harmonic drive gearbox is coupled to receive the first torque from the motor shaft and is operable, in response thereto, to supply a second torque. The actuator is coupled to receive the second torque from the harmonic drive gearbox and is configured, in response thereto, to move to a position. The latch rotor is coupled to the motor shaft to rotate therewith. The one or more permanent magnets are spaced apart from, and at least partially surround, the latch rotor, and supply a permanent magnetic field that opposes rotation of the latch rotor. The latch electromagnet is adapted to receive a flow of electrical current and, upon receipt thereof, to generate a magnetic field that opposes the permanent magnetic field supplied from the permanent magnets.

In another exemplary embodiment, an actuation control system includes a motor assembly, a control circuit, a harmonic drive gearbox, an actuator, a latch rotor, one or more permanent magnets, and a latch electromagnet. The motor assembly includes a motor and a motor shaft. The motor is configured to be controllably energized and, in response to being controllably energized, to supply a first torque to the motor shaft. The control circuit is adapted to receive input signals and is operable, in response thereto, to controllably energize the motor and to selectively supply latch control signals. The harmonic drive gearbox is coupled to receive the first torque from the motor shaft and is operable, in response thereto, to supply a second torque. The actuator is coupled to receive the second torque from the harmonic drive gearbox and is configured, in response thereto, to move to a position. The latch rotor is coupled to the motor shaft to rotate therewith. The one or more permanent magnets are spaced apart from, and at least partially surround, the latch rotor. The permanent magnets supply a permanent magnetic field that opposes rotation of the latch rotor. The latch electromagnet is adapted to receive a flow of electrical current and, upon receipt thereof, to generate a magnetic field that opposes the permanent magnetic field supplied from the permanent magnets.

In yet a further exemplary embodiment, an actuator assembly includes a motor assembly, a harmonic drive gearbox, an actuator, a latch rotor, one or more permanent magnets, and a latch electromagnet. The motor assembly includes a pancake motor and a motor shaft. The pancake motor is configured to supply a first torque to the motor shaft. The harmonic drive gearbox is coupled to receive the first torque from the motor shaft and is operable, in response thereto, to supply a second torque. The actuator is coupled to receive the second torque from the harmonic drive gearbox and is configured, in response thereto, to move to a position. The latch rotor coupled to the motor shaft to rotate therewith. The one or more permanent magnets are spaced apart from, and at least partially surround, the latch rotor. The permanent magnets supply a permanent magnetic field that opposes rotation of the latch rotor. The latch electromagnet is adapted to receive a flow of electrical current and, upon receipt thereof, to generate a magnetic field that opposes the permanent magnetic field supplied from the permanent magnets. The latch electromagnet includes a latch stator and a plurality of latch windings. The latch stator is non-rotationally mounted adjacent to, and at least partially surrounds, the latch rotor. The latch windings are wound around at least a portion of the latch stator, and are adapted to receive the flow of electrical current and, upon receipt thereof, to generate the magnetic field. The permanent magnets are mounted on the latch stator and are disposed adjacent each of the latch windings.

Furthermore, other desirable features and characteristics of the actuator assembly will become apparent from the subsequent detailed description and appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
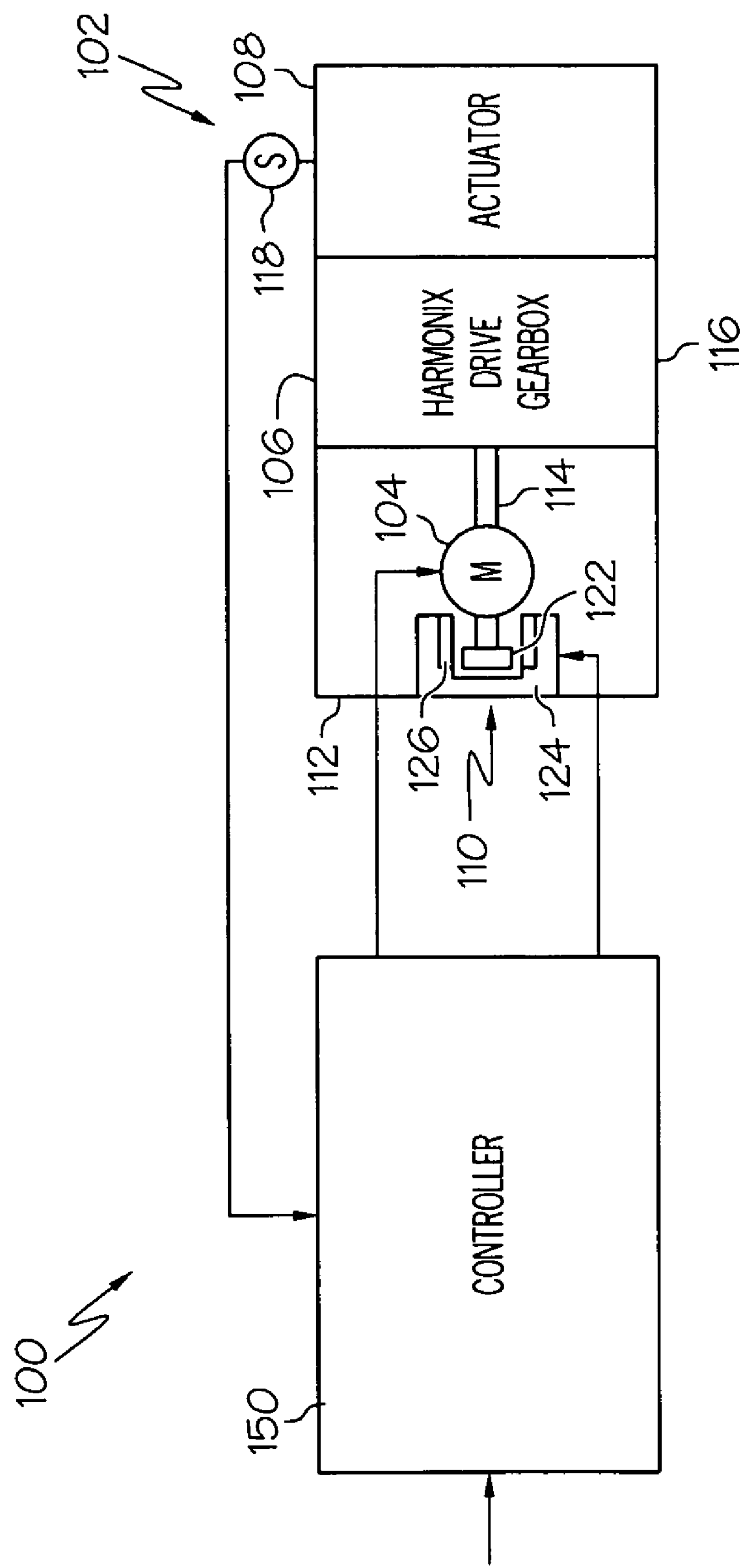
FIG. 1 is a functional block diagram of an exemplary actuation control system according to an embodiment of the present invention.

Turning now to FIG. 1, a functional block diagram of an exemplary actuator control system 100 is shown. The system 100, which may be used to control the movement of any one of numerous non-illustrated components, includes an actuator assembly 102 and a control circuit 150. The actuator assembly 102 includes a power drive unit 104, a harmonic drive gearbox 106, an actuator 108, and a latch mechanism 110. The power drive unit 104 is preferably implemented as a motor 104, is preferably enclosed within a motor housing 112, and includes an output shaft 114. The motor 104 is preferably implemented as an electric motor, and may be any one of numerous types of AC or DC motors now known or developed in the future including, for example, an AC induction motor, a brushed DC motor, or a brushless DC motor. Moreover, in a preferred embodiment, the motor 104 is implemented as a pancake motor. As is generally known, a pancake motor has a relatively large diameter compared to its thickness, and thus has a fairly compact space envelope.

No matter how the motor 104 is specifically implemented, it is configured, upon being properly energized, to rotate and thereby supply a torque to the motor shaft 114. The motor shaft 114 extends from the motor housing 112, and is coupled to the harmonic drive gearbox 106. In response to the torque supplied from the motor shaft 114, the harmonic drive gearbox 106 supplies a torque, at a significantly reduced rotational speed from that of the motor shaft 114, to the actuator 108. To implement this rotational speed reduction, the harmonic drive gearbox 106 includes a plurality of interconnected components, all disposed within a housing 116. For completeness, an exemplary embodiment of these internal components will now be briefly described.

Figure 2:
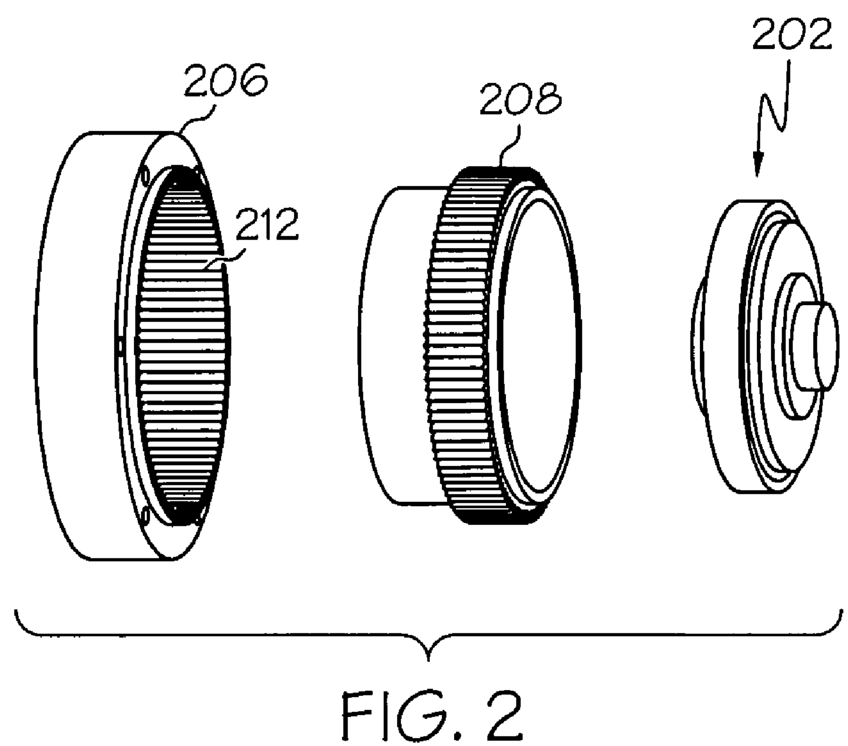
FIG. 2 is an exploded view of an exemplary harmonic drive that may be used to implement the actuator shown in FIG. 1.
Figure 3:
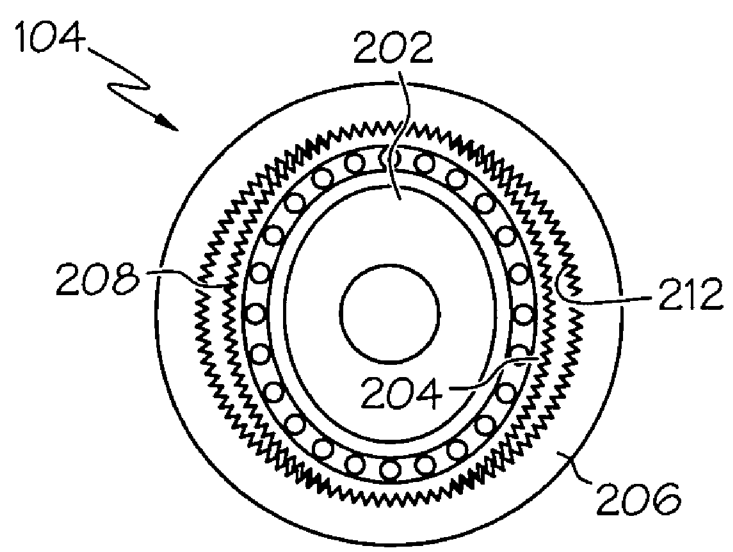
FIG. 3 is a cross section end view of the exemplary harmonic drive of FIG. 2.

With reference now to FIGS. 2 and 3, exploded and end views, respectively, of an exemplary embodiment of the interconnected internal components of the harmonic drive 106 are shown. The harmonic drive gearbox 106, which may be physically implemented in any one of numerous structural configurations now known or developed in the future, includes a wave generator 202, a flexspline 204, and a circular spline 206. The wave generator 202 is coupled to, and thus rotates with, the motor shaft 114 and has an outer surface that is generally elliptically shaped. The wave generator 202 is disposed within the flexspline 204.

The flexspline 204 is coupled to, and thus supplies a drive force to, the actuator 108. The flexspline 204 is implemented as a relatively thin-walled cylinder, and includes a plurality of gear teeth 208 formed on the outer surface of a portion thereof. The flexspline 204 is configured such that it is radially compliant, yet torsionally stiff. Thus, as FIG. 2 shows, the when the wave generator 202 is disposed within the flexspline 204, the flexspline outer surface conforms to the same elliptical shape as the wave generator 202.

The circular spline 206 surrounds the flexspline 204 and, at least in the depicted embodiment, is mounted against rotation. A plurality of gear teeth 212 are formed into the inner surface of the circular spline 206, and mesh with the flexspline gear teeth 208 along the major axis of the ellipse. Because the flexspline 204 has less gear teeth 208 than the circular spline 206, a reduction in rotational speed between the input and output of the harmonic drive 106 is achieved. Although the difference in number of gear teeth may vary, in a typical configuration, there are two less flexspline gear teeth 208 than circular spline gear teeth 212.

Before returning to the description of the actuation control system 100, it will be appreciated that the above-described harmonic drive gearbox 106 is merely exemplary of a particular embodiment, and that harmonic drive gearboxes 106 of various other configurations and implementations could be used. Moreover, although the above-described harmonic drive gearbox 106 is configured such that the flexspline 204 is coupled to the actuator 108, it will be appreciated that the harmonic drive gearbox 106 could also be configured such that the circular spline 206 is coupled to the actuator 108.

Returning once again to FIG. 1, the actuator 108, as was noted above, is coupled to receive a torque, at a significantly reduced rotational speed from that of the motor shaft 114, from the harmonic drive gearbox 106. The actuator 108, in response to this torque, is configured to move to a position. It will be appreciated that the actuator 108 may be implemented as any one of numerous types of actuators now known or developed in the future. For example, the actuator 108 could be implemented as any one of numerous types of rotary actuators and/or numerous types of linear actuators, just to name a few.

The latch mechanism 110 is preferably disposed within the motor housing 112 and includes a latch rotor 122, an electromagnet 124, and a plurality of permanent magnets 126. The latch rotor 122 is preferably coupled to, or integrally formed as part of, the motor output shaft 114, though it could be coupled to, or integrally formed as part of, any one of numerous other components to effect its function, which is described in more detail further below. In the depicted embodiment the latch rotor 122 is coupled to an end of the output shaft 114 that is opposite to the end that is coupled to the harmonic drive gearbox 106. It will be appreciated, however, that this is merely exemplary, and that the rotor could be mounted on the same end of the output shaft 114 that is coupled to the harmonic drive gearbox 106. No matter on which end of the motor output shaft 114 it is mounted, the latch rotor 122 is preferably constructed, at least partially, of a magnetically permeable material.

The electromagnet 124 is non-rotationally mounted on, for example, the motor housing 112, and at least partially surrounds the latch rotor 122. The electromagnet 124 is configured, upon being energized with a flow of direct current (DC) from a DC power source, to generate a magnetic field. It will be appreciated that the DC power source may be any one of numerous types of power sources, and may be implemented as part of or remote from the system 100. In the depicted embodiment, the DC power source, as will be described below, is implemented within the control circuit 150. No matter the specific source of the DC current, the magnetic field that is generated opposes the magnetic field that is generated by the permanent magnets 126, thus allowing uninhibited rotation of the motor 104.

The permanent magnets 126 are coupled to the electromagnet 124 and are spaced apart from, and at least partially surround, the latch rotor 122. The permanent magnets 126 are configured to supply a permanent magnetic field that opposes rotation of the latch rotor 122. Thus, when no DC current is supplied to the electromagnet 124 and the motor 104 is not energized for rotation, the permanent magnetic field supplied from the permanent magnets 126 holds the latch rotor 122, and thus the motor output shaft 114, is held in place. As noted above, the electromagnet 124 is energized to generate a magnetic field having a polarity opposite to that of the permanent magnets 126, to allow motor 104 rotation with no resistance from the latch mechanism 110.

The control circuit 150 controllably energizes the motor 104 and supplies latch control signals to the latch mechanism 110. The control circuit 150 may be configured to receive external control signals from one or more external sources (not shown in FIG. 1). In response to these control signals, the control circuit 150 controllably energizes the motor 104 and supplies the latch control signals to the latch mechanism 110. The motor 104, upon being energized, rotates in the direction that will cause the actuator 108 to move to a desired position. The latch control signals may be in the form of DC current that flows through the electromagnet 124, or in the form of a control signal that causes a separate power source to supply the DC current flow through the electromagnet 124. In either case, the DC current flow, as noted above, appropriately energizes the electromagnet 124 to generate a magnetic field that opposes the permanent magnetic field supplied from the permanent magnets 126. The control circuit 150, using feedback signals supplied from, for example, a suitably configured actuator position sensor 118, implements closed-loop control to move the actuator 108 to the desired position.

When the actuator 108 attains the desired position, the control circuit 150 no longer controllably energizes the motor 104, but continues to supply latch control signals to the electromagnet 124. More specifically, the latch control signals supplied to the electromagnet 124 now generates a magnetic field that interacts with and aids the permanent magnetic field supplied from the permanent magnets 126. The magnetic fields together interact with the latch rotor 122 and prevent further rotation of the motor output shaft 114. It will be appreciated that the control circuit 150 may be configured to implement any one of numerous control schemes.

With reference to FIGS. 4-7, various exemplary embodiments of particular physical implementations of the latch mechanism 110 described above are depicted, and will now be described in more detail. The latch rotor 122, as noted above, is configured to be mounted on the motor output shaft 114, and includes a main body 402 and a plurality of lobes 404 extending radially therefrom. As noted above, the latch rotor 122 is at least partially constructed of a magnetically permeable material. In this regard, at least the lobes 404, or at least portions thereof, are constructed of a magnetically permeable material. It will be appreciated, however, that the entire latch rotor 122 could be constructed of a magnetically permeable material.

Figure 4:
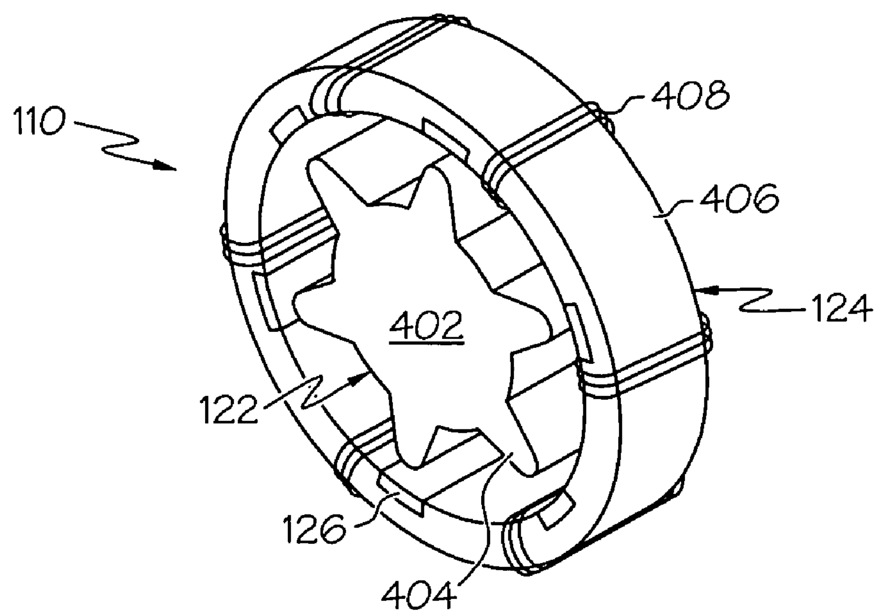
FIGS. 4 and 5 are perspective and end views, respectively, of an exemplary physical implementation of an electromagnetic latch mechanism that may be used to in the system of FIG. 1.
Figure 5:
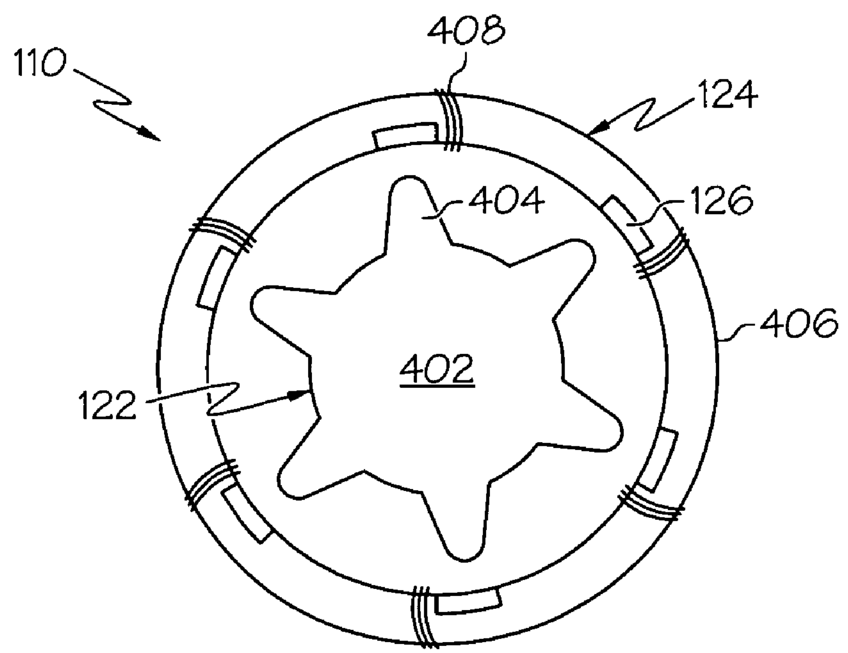
Figure 6:
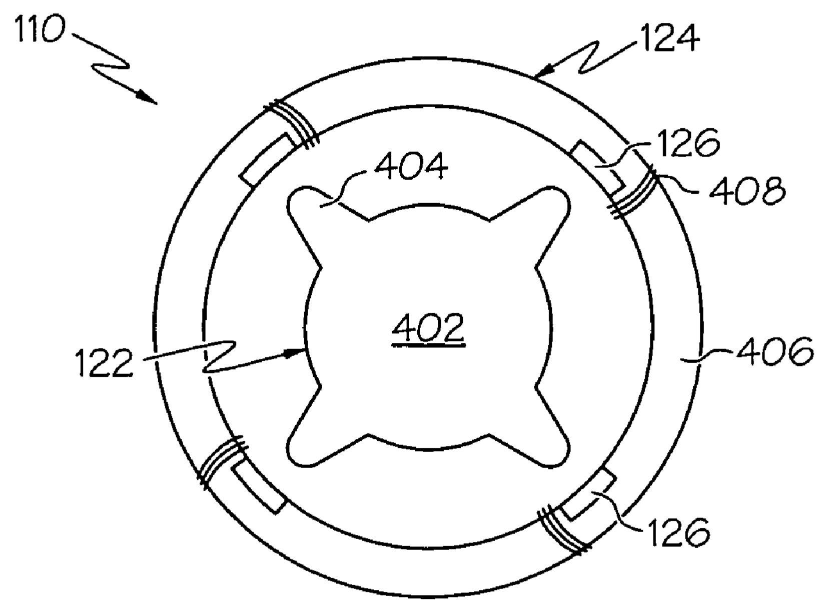
FIGS. 6 and 7 are end views of exemplary alternative embodiments of the electromagnetic latch mechanism depicted in FIGS. 4 and 5.
Figure 7:
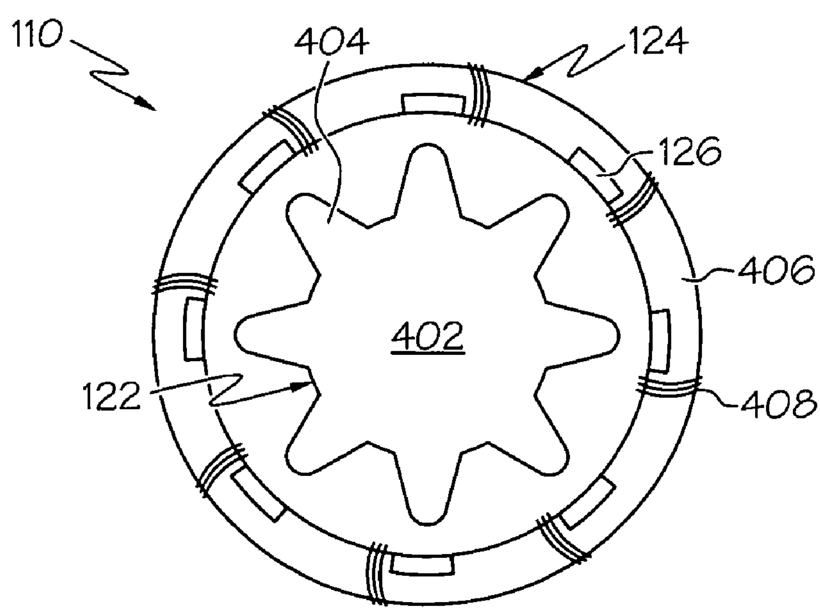

The electromagnet 124 includes a latch stator 406, and a plurality of latch coils 408. The latch stator 406 is configured to be mounted on the motor housing 112, and at least partially surrounds the latch rotor 122. The permanent magnets 126 are preferably disposed within the latch stator 406, and the latch coils 208 are wound around the latch stator 406 adjacent each of the permanent magnets 126. The latch coils 408 are wound in a manner that, upon being energized with DC current, the latch coils 408 generate the same number of magnetic pole pairs as there are permanent magnets 126, and in a manner that opposes or aids the permanent magnetic field supplied from each permanent magnet 126. When current flows through the latch coils 408 in one direction, the generated magnetic pole pairs oppose the permanent magnetic field supplied from each permanent magnet 126, and when current flows through the latch coils 408 in the opposite direction, the generated magnetic pole pairs aid the permanent magnetic field supplied from each permanent magnet 126. In FIGS. 4 and 5 it is seen that the latch rotor 122 includes six lobes 404, thus there are three permanent magnet pole pairs and the latch coils 408 are wound on the latch stator 406 in a manner that generates three magnetic pole pairs. Alternatively, in the embodiment depicted in FIG. 6 the latch rotor 122 includes four lobes 404, so there are two permanent magnet pole pairs and the latch coils 408 are wound on the latch stator 406 in a manner that generates two magnetic pole pairs, and in the embodiment depicted in FIG. 7, the latch rotor 122 includes eight lobes 404, so there are four permanent magnet pole pairs and the latch coils 408 are wound on the latch stator 406 in a manner that generates four magnetic pole pairs.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator assembly, comprising:

a motor assembly including a motor and a motor shaft, the motor configured to supply a first torque to the motor shaft;

a harmonic drive gearbox coupled to receive the first torque from the motor shaft and operable, in response thereto, to supply a second torque;

an actuator coupled to receive the second torque from the harmonic drive gearbox and configured, in response thereto, to move to a position;

a latch rotor coupled to the motor shaft to rotate therewith, the latch rotor comprising a main body having a plurality of lobes that extend radially therefrom;

one or more permanent magnets spaced apart from and at least partially surrounding the latch rotor, each of the one or more permanent magnets having one or more pole pairs and supplying a permanent magnetic field that opposes rotation of the latch rotor; and a latch electromagnet adapted to receive a flow of electrical current and configured, upon receipt thereof, to generate a magnetic field that simultaneously opposes all of the permanent magnetic fields supplied from the one or more permanent magnets or simultaneously aids all of the permanent magnetic fields supplied from the one or more permanent magnets, the electromagnet comprising:

a latch stator non-rotationally mounted adjacent to, and at least partially surrounding, the latch rotor, the latch stator having the one or more permanent magnets mounted thereon, and a plurality of latch windings wound around at least a portion of the latch stator, the latch windings disposed adjacent the one or more permanent magnets and adapted to receive the flow of electrical current, the latch windings wound on the latch stator such that, upon receipt of the flow of electrical current, the latch windings generate the same number of magnetic pole pairs as there are permanent magnet pole pairs.

2. The actuator assembly of claim 1, wherein at least a portion of each of the plurality of lobes comprises a magnetically permeable material.

3. The actuator assembly of claim 1, wherein the motor is a pancake motor.

4. The actuator assembly of claim 1, wherein:

the harmonic drive gearbox comprises a wave generator, a flexspline, and a circular spline; and the actuator is coupled to the flexspline.

5. The actuator assembly of claim 1, wherein:

the harmonic drive gearbox comprises a wave generator, a flexspline, and a circular spline; and the actuator is coupled to the circular spline.

6. An actuation control system, comprising:

a motor assembly including a motor and a motor shaft, the motor configured to be controllably energized and, in response to being controllably energized, to supply a first torque to the motor shaft;

a control circuit adapted to receive input signals and operable, in response thereto, to controllably energize the motor and to selectively supply latch control signals;

a harmonic drive gearbox coupled to receive the first torque from the motor shaft and operable, in response thereto, to supply a second torque;

an actuator coupled to receive the second torque from the harmonic drive gearbox and configured, in response thereto, to move to a position;

a latch rotor coupled to the motor shaft to rotate therewith, the latch rotor comprising a main body having a plurality of lobes that extend radially therefrom;

one or more permanent magnets spaced apart from and at least partially surrounding the latch rotor, each of the one or more permanent magnets having one or more pole pairs and supplying a permanent magnetic field that opposes rotation of the latch rotor; and a latch electromagnet adapted to receive a flow of electrical current and configured, upon receipt thereof, to generate a magnetic field that simultaneously opposes all of the permanent magnetic fields supplied from the one or more permanent magnets or simultaneously aids all of the permanent magnetic fields supplied from the one or more permanent magnets, the electromagnet comprising:

a latch stator non-rotationally mounted adjacent to, and at least partially surrounding, the latch rotor, the latch stator having the one or more permanent magnets mounted thereon, and a plurality of latch windings wound around at least a portion of the latch stator, the latch windings disposed adjacent the one or more permanent magnets and adapted to receive the flow of electrical current, the latch windings wound on the latch stator such that, upon receipt of the flow of electrical current, the latch windings generate the same number of magnetic pole pairs as there are permanent magnet pole pairs.

7. The system of Claim 6, wherein at least a portion of each of the plurality of lobes comprises a magnetically permeable material.

8. The system of claim 6, further comprising:

a power source coupled to receive the latch control signals and operable, upon receipt thereof, to supply the flow of electrical current to the electromagnet.

9. The system of claim 6, wherein the motor is a pancake motor.

10. The system of claim 6, wherein:

the harmonic drive gearbox comprises a wave generator, a flexspline, and a circular spline; and the actuator is coupled to the flexspline.

11. The system of claim 6, wherein:

the harmonic drive gearbox comprises a wave generator, a flexspline, and a circular spline; and the actuator is coupled to the circular spline.

* * * * *